US012559389B2

(12) United States Patent
Asdahl et al.

(10) Patent No.: US 12,559,389 B2
(45) Date of Patent: Feb. 24, 2026

(54) BUBBLE SIZE MONITORING AND CONTROL

(71) Applicant: Schlumberger Technology Corporation, Sugar Land, TX (US)

(72) Inventors: Steinar Asdahl, Porsgrunn (NO); Michel Iver Tveitan Maelum, Porsgrunn (NO); Karsten Rabe, Porsgrunn (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 530 days.

(21) Appl. No.: 17/820,438

(22) Filed: Aug. 17, 2022

(65) Prior Publication Data

US 2022/0396502 A1      Dec. 15, 2022

Related U.S. Application Data

(62) Division of application No. 15/751,021, filed as application No. PCT/US2016/048825 on Aug. 26, 2016, now abandoned.

(Continued)

(51) Int. Cl.
| | |
|---|---|
| *C02F 1/00* | (2023.01) |
| *B01D 17/02* | (2006.01) |

(Continued)

(52) U.S. Cl.
CPC .......... *C02F 1/008* (2013.01); *B01D 17/0205* (2013.01); *B01D 19/00* (2013.01);
(Continued)

(58) Field of Classification Search
None
See application file for complete search history.

(56) References Cited

U.S. PATENT DOCUMENTS

| | | | |
|---|---|---|---|
| 4,031,006 A | 6/1977 | Ramirez et al. | |
| 5,080,802 A | 1/1992 | Cairo, Jr. et al. | |

(Continued)

FOREIGN PATENT DOCUMENTS

| | | |
|---|---|---|
| CA | 2462740 A1 | 9/2005 |
| CA | 2485873 A1 | 4/2006 |

(Continued)

OTHER PUBLICATIONS

International Search Report and Written Opinion issued in the related PCT application PCT/US2016/048825, dated Jan. 17, 2017 (12 pages).

(Continued)

*Primary Examiner* — Richard C Gurtowski
(74) *Attorney, Agent, or Firm* — Kyle R. Miiller

(57) ABSTRACT

Disclosed herein is a device and methods for enhancing oil separation from produced water. One such method includes mixing a multiphase fluid having at least a water phase and an oil phase with a flotation gas, according to at least one operating condition, so as to produce an enhanced multiphase fluid having bubbles of the flotation gas therein. The oil phase is then separated from the water phase using a separator. At least one property associated with the enhanced multiphase fluid is monitored. The operating condition is adjusted as a function of the monitored property so as to increase a percentage of the oil phase separated from the water phase by the separator over a percentage of the oil phase that would be separated from the water phase without adjustment of the operating condition.

11 Claims, 8 Drawing Sheets

Related U.S. Application Data

(60) Provisional application No. 62/210,775, filed on Aug. 27, 2015.

(51) Int. Cl.

| | |
|---|---|
| *B01D 19/00* | (2006.01) |
| *B01F 23/231* | (2022.01) |
| *B01F 25/42* | (2022.01) |
| *B01F 35/21* | (2022.01) |
| *B01F 35/221* | (2022.01) |
| *C02F 1/20* | (2023.01) |
| *C02F 1/24* | (2023.01) |
| *B01F 23/232* | (2022.01) |
| *B01F 35/213* | (2022.01) |
| *B01F 101/00* | (2022.01) |
| *B03D 1/02* | (2006.01) |
| *C02F 101/32* | (2006.01) |
| *C02F 103/10* | (2006.01) |

(52) U.S. Cl.

CPC ............ *B01F 23/231* (2022.01); *B01F 25/42* (2022.01); *B01F 35/2113* (2022.01); *B01F 35/2213* (2022.01); *B01F 35/2217* (2022.01); *C02F 1/20* (2013.01); *C02F 1/24* (2013.01); *B01F 23/2323* (2022.01); *B01F 35/213* (2022.01); *B01F 35/2211* (2022.01); *B01F 2101/305* (2022.01); *B03D 1/028* (2013.01); *C02F 2101/32* (2013.01); *C02F 2103/10* (2013.01); *C02F 2209/03* (2013.01); *C02F 2209/38* (2013.01); *C02F 2209/40* (2013.01)

(56) References Cited

U.S. PATENT DOCUMENTS

| | | | |
|---|---|---|---|
| 5,275,732 A | | 1/1994 | Wang et al. |
| 5,393,417 A | | 2/1995 | Cox |
| 6,408,679 B1 | * | 6/2002 | Kline-Schoder ..... A61B 8/4209 |
| | | | 73/602 |
| 7,426,852 B1 | | 9/2008 | Rothman |
| 9,115,006 B2 | | 8/2015 | Gilmour et al. |
| 10,040,074 B2 | | 8/2018 | Damann |
| 2005/0109701 A1 | | 5/2005 | Morse et al. |
| 2006/0060512 A1 | * | 3/2006 | Astle ......................... C02F 9/20 |
| | | | 210/90 |
| 2008/0112257 A1 | * | 5/2008 | Masuda ................ B01F 23/234 |
| | | | 366/101 |
| 2011/0168640 A1 | | 7/2011 | Gilmour et al. |
| 2013/0207283 A1 | * | 8/2013 | Rabe .................. B01D 17/0217 |
| | | | 261/74 |
| 2014/0016433 A1 | * | 1/2014 | Jack ...................... B01F 23/232 |
| | | | 366/151.1 |
| 2018/0244539 A1 | | 8/2018 | Asdahl et al. |

FOREIGN PATENT DOCUMENTS

| | | | |
|---|---|---|---|
| CN | 1474710 A | | 2/2004 |
| GB | 2336905 A | | 11/1999 |
| JP | 2006334556 A | | 12/2006 |
| JP | 200721392 A | | 2/2007 |
| WO | 03086978 A1 | | 10/2003 |

OTHER PUBLICATIONS

International Preliminary Report on Patentability issued in the related PCT application PCT/US2016/048825, dated Mar. 8, 2018 (9 pages).

Extended Search Report issued in the EP application No. 16840177. 6, mailed Apr. 2, 2019, 7 pages.

Office Action issued in the CN application 201680049575.X, dated Sep. 2, 2020 (27 pages).

Office Action issued in the JP application 2018-510917, dated Aug. 11, 2020 (27 pages).

Examination Report issued in the SA application 518391019, dated Dec. 9, 2020 (8 pages).

Office Action issued in the JP application 2018-510917, dated Mar. 4, 2021, 5 pages with English Translation.

R.T. Rodriquez et al., New Basis for measuring the size distribution of bubbles, Mineral Engineering: Pergamon 8 Press: Oxford, GB. vol. 16, No. 8, Aug. 1, 2003; pp. 757-765.

\* cited by examiner

OIL AND GAS OUTLET

ENHANCED
MULTIPHASE
FLUID

102

WATER OUTLET

108

130

131

BUBBLE SIZE MONITORING AND CONTROL

CROSS-REFERENCE TO RELATED APPLICATION

This patent application is Divisional of application Ser. No. 15/751,021 filed on Feb. 07, 2018, which is the National Stage entry of PCT/US2016/048825, filed on Aug. 26, 2016, and claims the benefit and priority of provisional application, U.S. Ser. No. 62/210,775, filed Aug. 27, 2016, entitled "BUBBLE SIZE MONITORING AND CONTROL", the contents of which are incorporated herein by reference in their entirety.

BACKGROUND

Field

This disclosure relates to the separation of a mixture of water, a fluid not miscible with water and having a lower density than water, and a gas into these components. In particular the disclosure relates to a combined degassing and flotation tank, which is particularly suited for use in separation processes where a water phase containing oil and gas are separated.

Description of the Related Art

Hydrocarbons are widely used as a primary source of energy, and have a great impact on the world economy. Consequently, the discovery and efficient production of hydrocarbon resources is increasingly noteworthy. As relatively accessible hydrocarbon deposits are depleted, hydrocarbon prospecting and production has expanded to new regions that may be more difficult to reach and/or may pose new technological challenges. During typical operations, a borehole is drilled into the earth, whether on land or below the sea, to reach a reservoir containing hydrocarbons. Such hydrocarbons are in the form of oil, gas, or mixtures thereof which may then be brought to the surface through the borehole.

Fluids produced from the well may be separated into gas and liquids inside a separator vessel. The water phase coming from the separation at the well-head or subsequent separators may be discharged into the sea after a cleansing that involves the partial removal of gas, oil, chemicals and other impurities. This cleansing is accomplished using equipment such as oil/gas separators, flotation tanks, hydro cyclones, and degassing tanks.

The volume of water accompanying the oil produced from a well may fluctuate and consequently the ability to separate the oil from the produced water may decrease, causing more oil to exit the clean water outlet of the separator and reducing the separator's efficiency. There is a desire for an improved oil-gas-water separator with a better ability to control the efficacy of the separation of the phases, especially when the produced water inflows may fluctuate during oil production from the wellbore.

SUMMARY

Some embodiments include a system for monitoring and controlling the efficiency of an oil-water separator.

Disclosed herein is a system including a first conduit for flowing a multiphase fluid and a flotation gas source. A mixing system has a first inlet in fluid communication with a downstream end of the first conduit, a second inlet in fluid communication with the flotation gas source, and an outlet. The mixing system serves to mix the multiphase fluid flowing from the downstream end of the first conduit with flotation gas from the flotation gas source so as to produce at the outlet an enhanced multiphase fluid having bubbles of the flotation gas therein. A second conduit has an upstream end in fluid communication with the outlet of the mixing system. A bubble control system is associated with the second conduit and serves to perform a measurement associated with a size of the bubbles of the flotation gas in the enhanced multiphase fluid, and control the mixing system in response to the measurement so as to influence the size of the bubbles of the flotation gas to be above a threshold.

Also disclosed herein is a method including mixing a multiphase fluid having a water phase and an oil phase with a flotation gas, according to an operating condition, so as to produce an enhanced multiphase fluid having bubbles of the flotation gas therein. The oil phase is then separated from the water phase using a separator. A property associated with the enhanced multiphase fluid is monitored. The operating condition is adjusted as a function of the monitored property so as to increase a percentage of the oil phase separated from the water phase by the compact flotation unit over a percentage of the oil phase that would be separated from the water phase without adjustment of the operating condition.

Further disclosed herein is a method including mixing a multiphase fluid with a flotation gas, according to an operating condition, so as to produce an enhanced multiphase fluid having bubbles of the flotation gas therein. The method also includes monitoring a property associated with the enhanced multiphase fluid, and adjusting the operating condition as a function of the monitored property so as to influence a size of the bubbles to be above a threshold.

BRIEF DESCRIPTION OF THE DRAWINGS

Certain embodiments of the disclosure will hereafter be described with reference to the drawings, wherein like reference numerals denote like elements. It should be understood, however, that the accompanying drawings illustrate the various implementations described herein and are not meant to limit the scope of various technologies described herein. The drawings show and describe various embodiments of the current disclosure.

DETAILED DESCRIPTION

In the following description, numerous details are set forth to provide an understanding of the present disclosure. It will be understood by those skilled in the art, however, that the embodiments of the present disclosure may be practiced without these details and that numerous variations or modifications from the described embodiments may be possible. In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "above" and "below"; and other like terms indicating relative positions above or below a given point or element are used in this description to more clearly describe some embodiments of the disclosure. Similarly, the terms "upstream" and "downstream" are used in this description to indicate relative positions along a path of fluid flow through an element.

The device and methods of the present disclosure have been developed to provide better control and improved efficiency of the separation processes of oil entrained in produced water. Due to the presence of the oil together with the produced water, the oil and water can collectively be referred to as a multiphase fluid. Various types of separators may be used to remove the oil from the produced water including oil/gas separators, flotation tanks, hydro cyclones, and degassing tanks.

Figure 1:
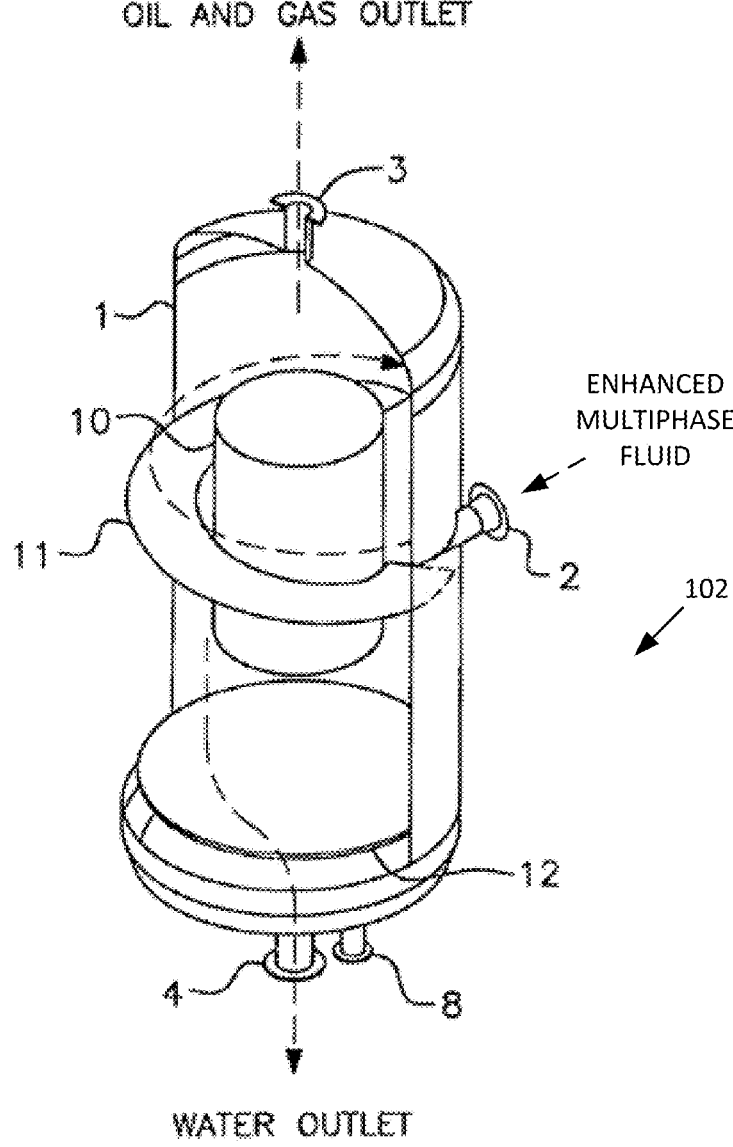
FIG. 1 shows a degassing and flotation tank type separator that may be used according to some embodiments of the disclosure.

FIG. 1 shows an example of one type of separator 102, a degassing and flotation tank, sometimes referred to as a compact flotation unit or CFU, that may be used according to some embodiments of the disclosure. The CFU 102 uses gas flotation and centrifugal forces to separate and remove the oil and other particles from the water phase of the multiphase fluid. The CFU 102 includes a cylindrical vertical tank 1, a tangentially arranged inlet 2 for the produced water phase, at least one outlet 3 for gas and oil placed in the upper part of the tank 1, an outlet 4 for water and an outlet 8 for sludge placed in the lower part of the tank 1, and an inner cylinder 10 forming a flotation and degassing zone between the inner cylinder 10 and the wall of the tank 1 in the upper part of the tank 1.

The cylindrical vertical tank 1 performs the desired separation of an oil/gas phase from a water phase of the multiphase fluid. In use for water treatment in oil production, remaining oil and gas can be removed from the outgoing water phase of the multiphase fluid providing an effluent with a very low content of hydrocarbons simultaneously with the removal of sand and other particulate materials. The tank 1 is provided with an inner cylinder 10 placed in the upper part of the tank leaving an open space between the inner cylinder 10 and the top of the tank. An inlet guide vane 11 may be placed between the tank 1 and the inner cylinder 10 leaving an open space between the inlet guide vane 11 and the inner cylinder 10 and a horizontal circular plate 12 in the lower portion of the tank 1, leaving a passage for water between the plate 12 and the tank 1. The inner cylinder 10 is arranged so that passage of oil, gas, and water is allowed over the top of the cylinder.

The flotation of oil drops is facilitated by the simultaneous rising of gas bubbles. Further, the inlet guide vane 11 causes the incoming water to flow spirally upward while the tangential inlet causes the incoming water to rotate in the tank 1, creating a centrifugal force which forces the lighter oil drops towards the center of the tank 1 until the inner cylinder 10 is met. There, oil bubbles and gas bubbles will coalesce and rise due to their lower density than the surrounding water. The oil and gas is then removed via an outlet 3 for oil and gas.

Additional gas, referred to herein at some places as flotation gas, may be injected into the produced water phase of the multiphase fluid before entering into the CFU 102 to improve separation and provide additional rising gas bubbles in the tank.

Figure 2:
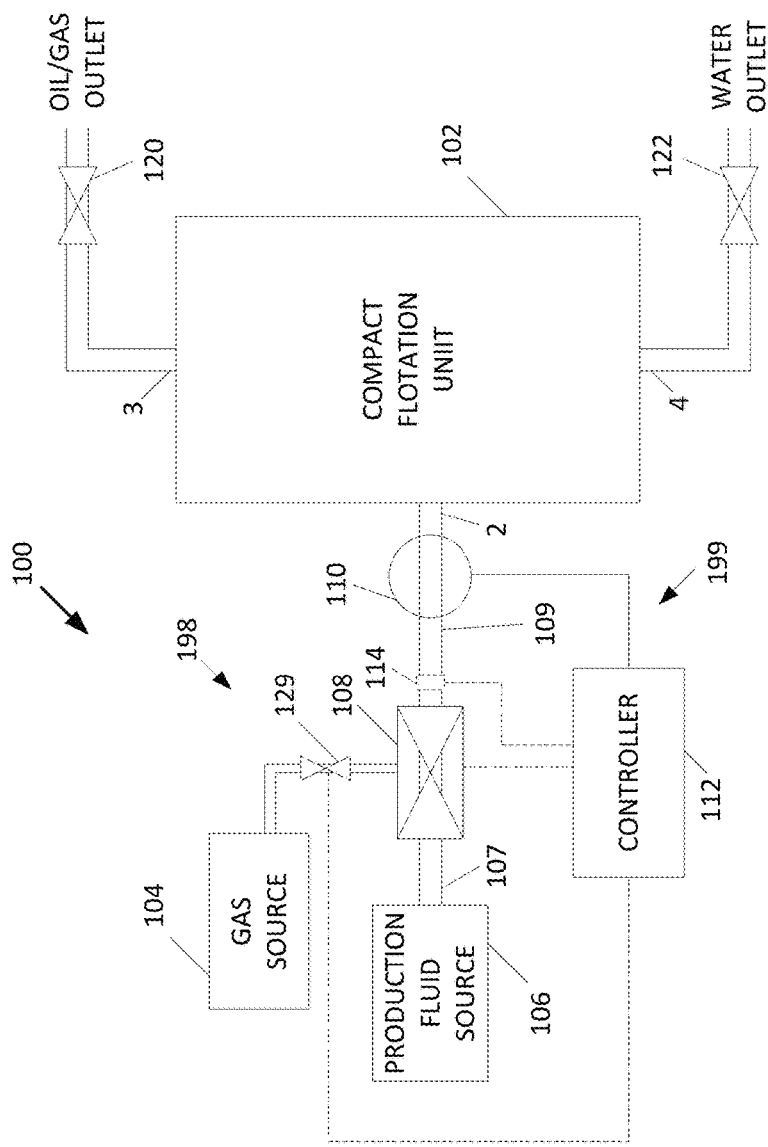
FIG. 2 shows a schematic drawing of layout arrangement of a produced water separation operation including an inline camera bubble monitor according to some embodiments of the disclosure.

A produced water separation system or operation 100 according to some embodiments of the disclosure is now described with additional reference to the schematic drawing of FIG. 2. Beginning the description with upstream components, a production fluid source 106 is in fluid communication with the first conduit 107 so as to supply the multiphase fluid thereto.

The multiphase fluid flows into the upstream end of the first conduit 107, and out through the downstream end of the first conduit 107 into a first inlet of the mixer 108, which is in fluid communication with first conduit 107. A flotation gas source 104, such as an external gas source or gas recycled from the top of the tank 1, is in fluid communication with a second inlet of the mixer 108 and feeds through optional gas valve 129 a flotation gas, such as nitrogen or fuel gas, to the second inlet of the mixer 108. The mixer 108 serves to mix the inflowing flotation gas with the inflowing multiphase fluid, and provides output of the multiphase fluid as enhanced (mixed) with the flotation gas through an optional external adjustable valve 114 and into an upstream end of the second conduit 109 in fluid communication with the outlet of the mixer 108.

As should be appreciated, the mixing of the flotation gas with the multiphase fluid by the mixer 108 results in formation of bubbles of the flotation gas within the multiphase fluid. The enhanced multiphase fluid flows into the upstream end of the second conduit 109, through an inline camera module 110, and out through the downstream end of the second conduit 109 into the inlet 2 of the CFU 102. This mixture of gas and oily water then rises to top of the CFU 102 as it enters the tank 1, enhancing separation. After separation, the oil and gas phases may be removed from the CFU 102 via the oil and gas outlet 3 and flow through valve 120, and the water phase may be removed from the CFU 102 via the water outlet 4 and flow through valve 122.

Gas bubble size distribution within the enhanced multiphase fluid may be influential for separation efficiency of a CFU 102. Bubbles that may be too small, e.g. less than 90-110 microns (e.g. 100 microns), may in some cases not reach the surface of the fluid within the CFU 102 to be removed through the outlet 3. Oil covered small scale bubbles will then exit through the clean water outlet 4. Bubbles that may be too large, e.g. more than 500 microns, may have an issue in that they may have a low flotation potential. The gas bubble size distribution may be dependent on the chemistry of the water, but the Inventors have found it to be closely related to and influenced by the pressure drop generated by the gas mixer 108 which mixes the flotation gas into the produced water. The present disclosure aims to provide technology for monitoring and controlling the bubble size distribution in the enhanced multiphase fluid entering the CFU 102.

Figure 6A:
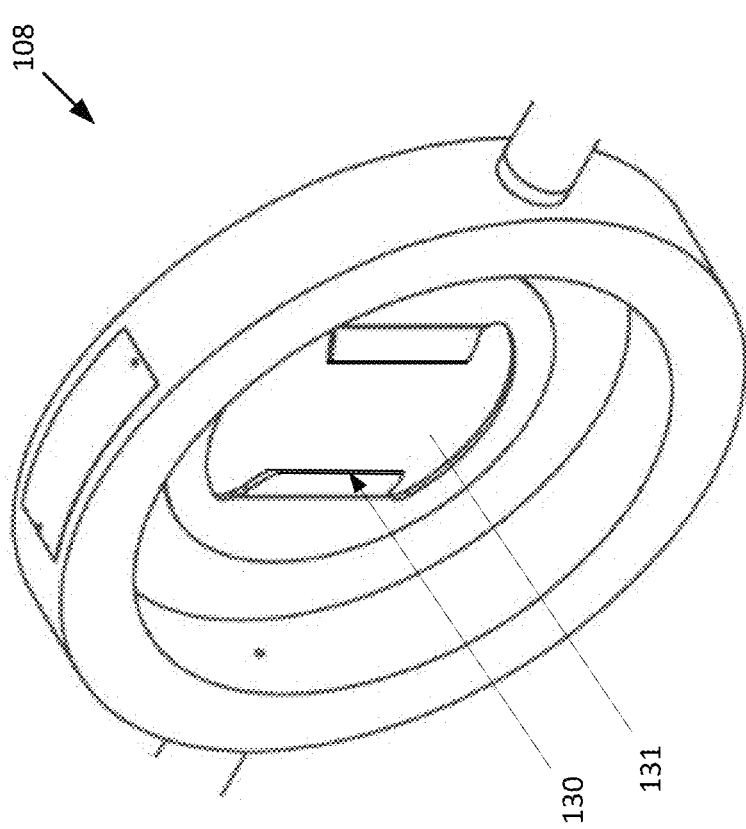
FIG. 6A shows a perspective view of a static mixer according to some embodiments of the disclosure.
Figure 6B:
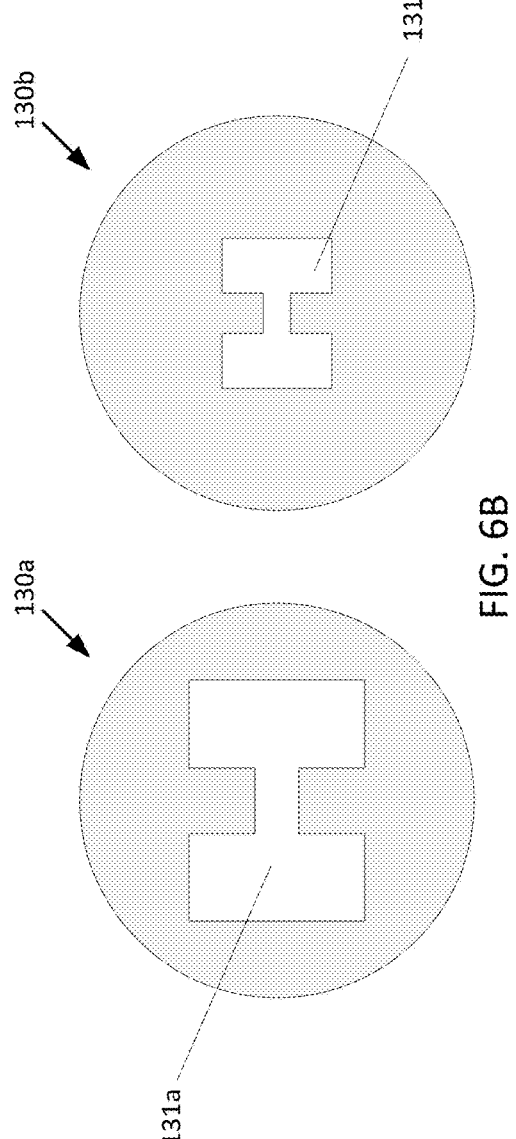
FIGS. 6B and 6C show various mixer plates having differing sizes and shapes according to some embodiments of the disclosure.
Figure 6C:
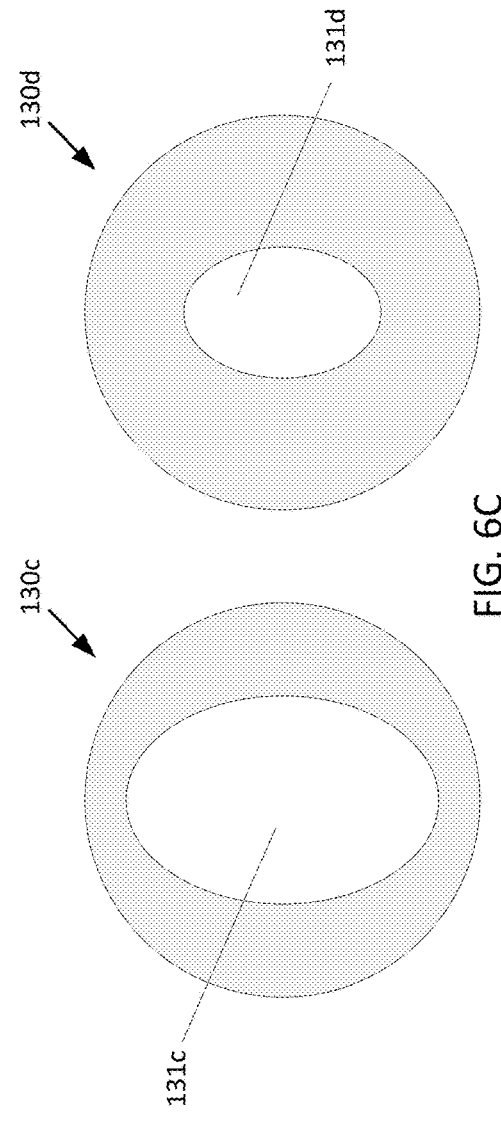
Figure 7:
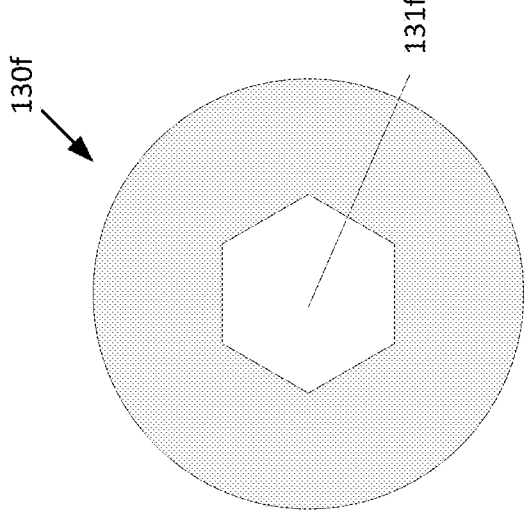
FIG. 7 shows an iris-diaphragm type variable valve of a dynamic mixer at various stages of opening and closing according to some embodiments of the disclosure.
Figure 7:
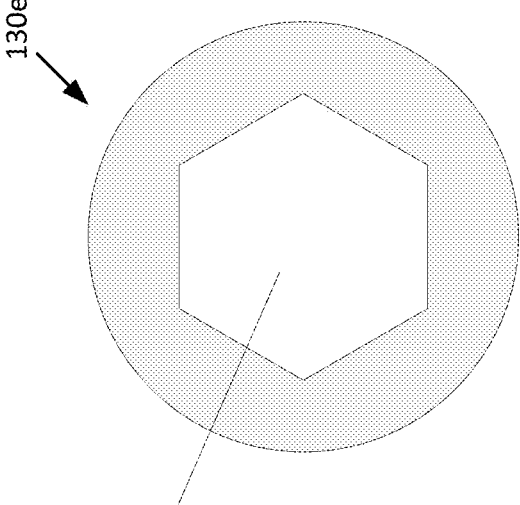

Current mixers 108, such as shown in FIGS. 6A-7, have a pressure drop according to the multiphase fluid as it passes through, and this pressure drop varies in the short term and during field life, potentially resulting in varying and non-optimum mixing and process efficiency. When the produced multiphase fluid flow rate to the CFU 102 changes, either increasing or decreasing, the fluid velocity through a current mixer can change due to various reasons, resulting in more or less turbulence and consequently resulting in the formation of smaller or larger gas bubbles in the multiphase fluid. For efficient oil removal, a particularly useful bubble size window exists, but the actual bubble size might fall outside of this range by having a fixed geometry mixer plate or otherwise static gas mixer.

Introduction of a dynamic mixer (capable of maintaining a desired pressure drop regardless of fluid flow rate) provided with a monitoring system or bubble control system provides the ability to maintain the majority of the gas bubbles above a first threshold value (e.g. above 100 microns) and below a second threshold value (e.g. below 500 microns)—that is, within the desired gas bubble size window—regardless of the changes to the produced multiphase fluid flow rate into the CFU. These thresholds are set so as to enable separation of a majority of the oil from the enhanced multiphase liquid, and thus the flowing of a majority of the oil phase from the oil outlet 3. Indeed, the use of the dynamic mixer increases the percentage of oil separation achieved by the CFU 102 over what would be separated without the adjustment capability provided by the dynamic mixer.

Further details of the system 100 and operation thereof will be given, but first it should be understood that here, the camera module 110 and controller 112 (described below) form and thus may collectively be referred to as a bubble control system 199, and that the mixer 108 and optional valves 129 and 114 form and thus may collectively be referred to as a mixing system 198.

A controller 112, such as a computer, microcontroller, system on a chip, microprocessor, programmable logic array, or field programmable gate array, is coupled to either (or both of) the mixer 108 and the optional adjustable valve 114, as well as to the camera module 110.

The camera module 110 includes a high speed camera that captures images of the bubbles as the enhanced multiphase fluid flows through the second conduit 109, and the controller 112 operates and monitors output of the camera module 110. In monitoring output of the camera module 110, the controller 112 performs image processing, so as to enable offline, inline, real-time, continuous monitoring and estimation of bubble size distribution of dispersed flotation gas in the enhanced multiphase fluid flowing through second conduit 109. Thus, the controller 112 is able to determine whether the bubble size distribution is within a desired range.

So as to provide hardware for changing and/or controlling the bubble size distribution, the mixer 108 may be a dynamic mixer capable of varying the size and/or shape of the opening or the position of a valve at its outlet under control of the controller 112. In some cases, the mixer 108 may instead have a fixed size and shape opening at its outlet, but an adjustable valve 114 under control of the controller 112 may be placed between the mixer 108 and conduit 109, between sections of the conduit 109, or within the conduit 109. In still other cases, the mixer 108 may be a dynamic mixer and the variable valve 114 may also be present.

FIGS. 6B and 6C show different fixed plates or restriction plates 130a-130d for the mixer 108 in the case where the mixer 108 has a fixed size and shape opening at its outlet, with each plate having a different size and shape opening 131a-131d through which the enhanced multiphase fluid flows.

Where the mixer 108 is a dynamic mixer, it could include any suitable restriction at its outlet causing a pressure drop; for example, a variable area orifice plate valve, a butterfly valve, a specially designed variable cage valve, or equivalent technology mixing the dispersed gas in the fluid. A dynamic mixer may also include an iris-diaphragm type variable valve 130e-130f as shown in FIG. 7, a valve having two or more plate sizes that can be changed, or other dynamic valve types where the size and/or shape of the opening through which the fluid flows may be altered.

Therefore, the use of the controller 112 with the camera module 110 provides a feedback loop, and the controller 112 may change the valve opening 131e-131f in real-time conditions or nearly real-time conditions based on the feedback loop so as to maintain the bubble size distribution within the desired range.

In some cases, the controller 112 may control the bubble size distribution produced at the outlet of the mixer 108 by controlling the rate of flow of flotation gas from the gas source 104 into the mixer 108. Thus, for example, the controller 112 may control the valve 129 (also referred to as a flotation gas source control) so as to alter the flow rate of gas from the gas source 104 as a function of the determination and monitoring of the bubble size distribution, to thereby maintain the bubble size distribution within a desired range. The control of the rate of flow of flotation gas may be performed in the absence of other control of the mixing system (i.e. may be performed with a static mixer 108 and without the presence of the valve 114), or may be performed in addition to the control of a dynamic mixer and/or control of valve 114. Adjustment of the valve 129 may also serve to provide adjustment of the pressure at which the flotation gas enters the second inlet of the mixer 108.

Monitoring the size of gas bubbles directly in the fashion described above may be complex and expensive. The Inventors have, however, found that a desired bubble size window or range may be linked to a simple pressure drop across a fixed or dynamic mixer 108. Indeed, it is now believed that the oil removal efficiency of the CFU 102 is dependent on the pressure drop across the upstream mixer 108. Thus, there is a desired pressure drop value corresponding to the gas distribution size window desired to improve efficiency. This may be accomplished by various methods. One method, as previously discussed, includes changing the size of a restriction plate in the mixer 108 or in an outlet valve of the mixer 108. FIGS. 6B and 6C shows examples of restriction plates 130a-130d having various shapes and sizes. Another method, as will be described below, includes utilizing the valve 114 to adjust the pressure drop. The resulting process efficiency using the valve 114 and a static mixer 108 in combination is also equal for the same pressure drop. Thus, a static mixer 108 and valve 114 may be used in combination to create similar results as a dynamic mixer, helping keep the bubble size distribution within the desired range regardless of a flow rate of the multiphase fluid through the first conduit 107.

In addition, the Inventors have found that the bubble size distribution is a function of the pressure drop. Thus, as explained above, the pressure drop across the mixer 108 may be monitored as a function of the position of the outlet valve in mixer 108, size or shape of an orifice within the outlet valve in mixer 108, or a size or shape of an orifice within a restriction plate 130a-130f within the mixer 108. The pressure drop may also be monitored as a function of position of the valve 114, size or shape of an orifice within the valve 114, or size or shape of an orifice within a restriction plate 130a-130f within the valve 114. The position of the outlet valve in mixer 108, size or shape of an orifice within the outlet valve in mixer 108, or a size or shape of an orifice within a restriction plate 130a-130f within the mixer 108 may then be adjusted or controlled as a function of the monitored pressure drop. Likewise, the position of the valve 114, size or shape of an orifice within the valve 114, or size or shape of an orifice within a restriction plate 130a-130f within the valve 114 may be adjusted or controlled as a function of the monitored pressure drop. This adjustment or control may be performed manually in the case where the mixer 108 is static, or in the case where the valve 114 is static. This adjustment or control may be performed under control of the controller 112 in the case where the mixer 108 is dynamic, or in the case where the valve 114 is dynamic.

Figure 3:
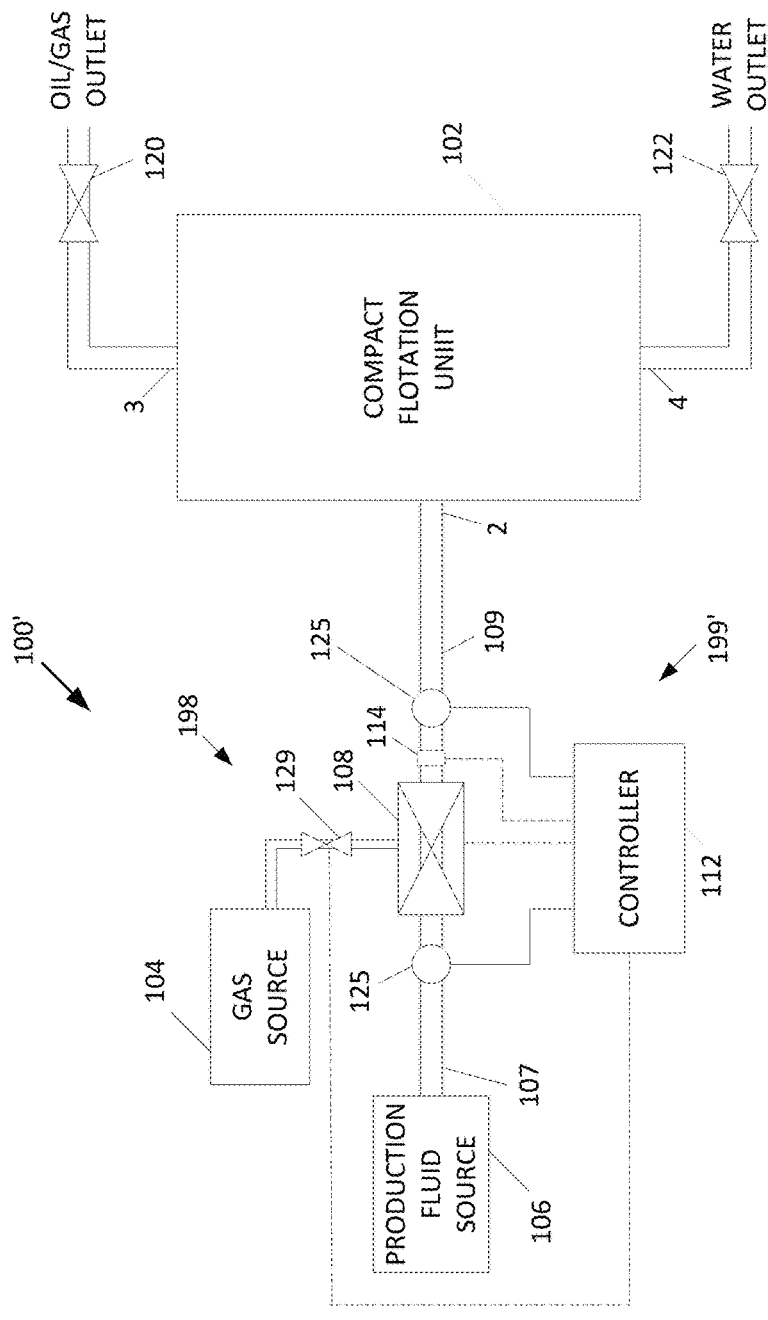
FIG. 3 shows a schematic drawing of layout arrangement of a produced water separation operation including a differential pressure monitor according to some embodiments of the disclosure.

FIG. 3 shows a schematic drawing of layout arrangement of a produced water separation system 100' including a differential pressure monitor 125 according to some embodiments of the disclosure. Other components are similar to or the same as described above and need no further discussion.

The differential pressure monitor 125 is of a suitable type and kind, and may be comprised of pressure sensors at the first inlet and at the outlet of the mixer 108 (or the outlet of the valve 114). The controller 112 may compare the readings of the pressure sensors of the differential pressure monitor 125 so as to determine the pressure drop across the mixer 108. The controller 112 may then control the mixer 108 and/or valve 114 as a function of the pressure drop so as to maintain the pressure drop within a desired range that maintains the bubble size distribution within a desired range.

Figure 4:
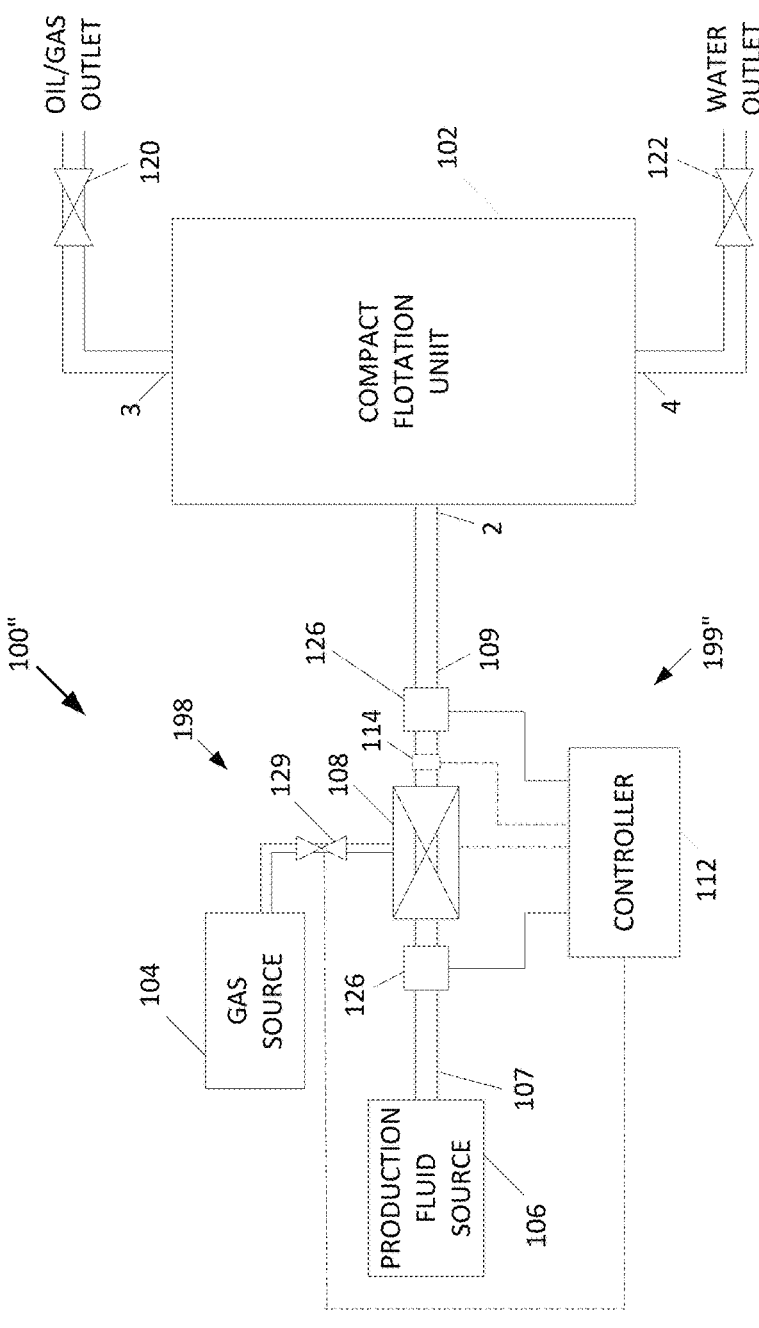
FIG. 4 shows a schematic drawing of layout arrangement of a produced water separation operation including a velocity monitor according to some embodiments of the disclosure.

Measured or estimated fluid velocity or other empirical correlations could be used as feedback to the controller 112 for use in controlling the mixer 108 and/or valve 114 so as to maintain bubble size distribution within a desired range. For example, as shown in FIG. 4, the system 100" may include fluid velocity or fluid flow meters 126 at the first inlet and/or at the outlet of the mixer 108 (or the outlet of the valve 114), such as to provide for estimation of the velocity of the multiphase fluid in the first conduit 107 and the enhanced multiphase fluid in the second conduit 109. The controller 112 may compare the readings of the velocity or flow meters 126 so as to determine the flow rate or fluid velocity increase across the mixer 108. The controller 112 may then control the mixer 108 and/or valve 114 as a function of the flow rate or velocity drop so as to maintain the flow rate or velocity increase within a desired range that maintains the bubble size distribution within a desired range.

Although in the configurations described thus far a single mixer 108, valve 114, gas valve 129, and camera module 110 have been shown, there may be multiple of each in some applications. For example, in the configuration 100''' shown in FIG. 5, there are two inline mixers 108a and 108b, each with a respective optional valve 114a, 114b at its output. A camera module 110a is positioned along the conduit 109a between the mixers 108a and 108b, and a camera module 110b is positioned along the conduit 109b between the mixer 108b and the CFU 102. The gas source 104 supplies gas to gas valves 129a and 129b, which in turn respectively supply gas to mixers 108a and 108b. These various components operate as described above, and are operated and controlled by controller 112 as described above.

The mixers 108a and 108b may, in the case that they are dynamic mixers, be operated in synchronization with one another, or asynchronously with one another. For example, the outlets of the dynamic mixers 108a and 108b may be controlled to have a same size, shape, or configuration, or may be controlled so as to have difference sizes, shapes, or configurations. In addition, one mixer 108a or 108b may be a static mixer, while the other is a dynamic mixer 108a or 108b. One, both, or neither of the optional valves 114a and 114b may be present, and may be operated as described with respect to the case of dynamic mixers 108a and 108b. Also, the valves 129a and 129b may also be operated synchronously or asynchronously. One or both of the camera modules 110a and 110b may be present.

Figure 5:
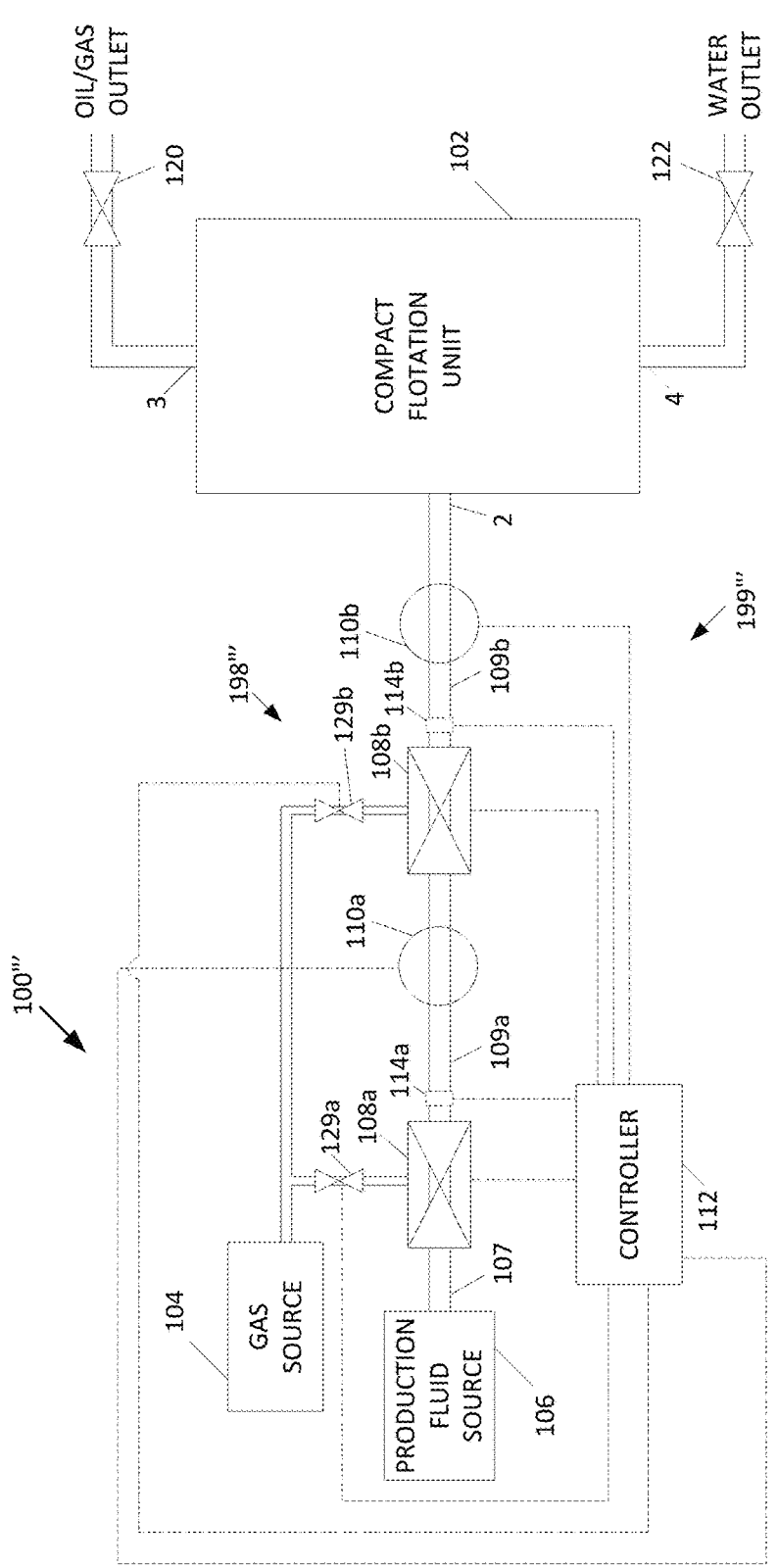
FIG. 5 shows a schematic drawing of layout arrangement of a produced water separation operation including multiple mixers and multiple inline camera bubble monitors according to some embodiments of the disclosure.

It should be apparent that with the previously described embodiments in FIGS. 3-4, multiple mixers 108, adjustable valves 114, gas valves 129, differential pressure monitors 125, and flow meters 126, may be used similarly to as shown in FIG. 5. Also, it should be apparent that different potential bubble control system 199, 199', 199", 199''' components described above may be mixed and matched. For example, one or more camera modules 110 may be used together with one or more differential pressure monitors 125 in a single application so as to provide for additional data for use by the controller 112 in controlling the mixers 108, adjustable valves 114, and gas valves 129.

Other suitable methods and technologies for measuring properties of the enhanced multiphase fluid and size of the bubbles may be used as well. For example, acoustic monitoring techniques may be used on the enhanced multiphase fluid as a way to estimate the size of the flotation gas bubbles, and the controller may use this information in controlling the mixer, and/or valve, and/or gas valve.

In some embodiments, the flotation gas can be released from the liquid water phase by pressure drop added downstream of the CFU 102. For example, with respect to the removal of dissolved flotation gas from the liquid water phase, the liquid water phase may be configured flow out the water outlet 4 in the cylindrical vertical tank 1 and into a conduit, vessel, or other fluid bearing structure having a diameter wider than that of the outlet 4 so as to cause the liquid water phase to undergo a drop in fluid pressure. This drop in fluid pressure may result in degasification of the liquid water phase, and thus flotation gas that has dissolved in the liquid water phase may exit the liquid water phase.

The systems 100, 100', 100", 100''' described above can work with and be installed with new CFU systems, or may be retrofitted to existing CFU installations. Where the systems 100, 100', 100" work with new CFU systems, the controller 112 may be the controller of the CFU as well. This helps enable optimization of process efficiency based on bubble size, regardless of changing fluid flow rates in the system 100, 100', 100", 100''' and regardless of different fluid chemistry.

Although the preceding description has been described herein with reference to particular means, materials and embodiments, it is not intended to be limited to the particulars disclosed herein; rather, it extends to functionally equivalent structures, methods, and uses, such as are within the scope of the appended claims.

The invention claimed is:
1. A system comprising:
a first conduit for flowing a multiphase fluid;

a flotation gas source;

a mixing system having a first inlet in fluid communication with a downstream end of the first conduit, a second inlet in fluid communication with the flotation gas source, an outlet, and a variable orifice plate valve positioned proximate to the outlet, the mixing system configured to mix the multiphase fluid flowing from the downstream end of the first conduit with flotation gas from the flotation gas source so as to produce at the outlet an enhanced multiphase fluid having bubbles of the flotation gas therein;

a second conduit having an upstream end in fluid communication with the outlet of the mixing system;

a separator comprising:

a tank in communication with the second conduit, a sludge outlet positioned proximate to a lower end of the tank, an inner cylinder forming a flotation and degassing zone between the inner cylinder and the tank, an inlet guide vane positioned between the tank and the inner cylinder, a circular plate proximate to the lower end of the tank, a first open space positioned between the inner cylinder and the inlet guide vane, and a second open space between the circular plate and the tank; and a bubble control system associated with the second conduit and configured to:

calculate a pressure drop across the mixing system via a first pressure sensor positioned upstream of the first inlet and a second pressure sensor positioned downstream of the outlet, and control the mixing system in response to the-calculated pressure drop so as to influence the size of the bubbles of the flotation gas to be above a threshold value.

2. The system of claim 1, wherein the bubble control system controls the mixing system in response to the calculated pressure drop so as to influence the size of the bubbles of the flotation gas to be above a first threshold value and below a second threshold value.

3. The system of claim 1, wherein the variable orifice plate valve of the mixing system is configured to adjust a pressure of the enhanced multiphase fluid as it flows therethrough; and wherein the bubble control system controls the mixing system by causing a position of the variable orifice plate valve to change.

4. The system of claim 1, wherein the mixing system includes a flotation gas source control for the flotation gas source; and wherein the bubble control system controls the mixing system by communicating with the flotation gas source control so as to change a flow rate of the flotation gas source.

5. The system of claim 1, wherein the mixing system includes an adjustable gas valve associated with the flotation gas source; and wherein the bubble control system controls the adjustable gas valve so as to adjust a pressure of the flotation gas as it enters the second inlet of the mixing system.

6. The system of claim 1, wherein the bubble control system comprises:

a camera associated with the second conduit and configured to capture images of the bubbles as the enhanced multiphase fluid flows through the second conduit; and a controller configured to analyze the bubbles by performing image processing on the images of the bubbles so as to estimate the size of the bubbles, and control the mixing system in response to the estimated size of the bubbles.

7. The system of claim 1, wherein the bubble control system comprises:

a differential pressure sensing apparatus associated with the first conduit, second conduit, and mixing system, and configured to calculate the pressure drop by determining a pressure differential between the multiphase fluid flowing into the first inlet of the mixing system and the enhanced multiphase fluid flowing out of the outlet of the mixing system; and a controller configured to control the mixing system in response to the determined pressure differential.

8. The system of claim 1, wherein the bubble control system is further configured to estimate a velocity of at least one of the multiphase fluid in the first conduit and the enhanced multiphase fluid in the second conduit.

9. The system of claim 1, wherein the bubble control system controls the mixing system in response to the calculated pressure drop so as to influence the size of the bubbles of the flotation gas to be above the threshold value regardless of a flow rate of the multiphase fluid through the first conduit.

10. The system of claim 1, wherein the threshold value is greater than 100 microns.

11. The system of claim 1, wherein the separator further comprises an oil outlet through which at least a portion of an oil phase of the enhanced multiphase fluid may be permitted to flow; and wherein the threshold value is sufficient so as to permit flowing of a majority of the oil phase through the oil outlet.

* * * * *